(12) United States Patent
Inagaki et al.

(10) Patent No.: US 10,399,762 B2
(45) Date of Patent: Sep. 3, 2019

(54) PACKAGING MATERIAL, PACKAGING BAG, PACKAGING CONTAINER, AND PACKAGED BODY

(71) Applicants: CHOKOKU PLAST CORPORATION, Osaka-shi, Osaka (JP); Hiromichi Inagaki, Inuyama-shi, Aichi (JP)

(72) Inventors: Hiromichi Inagaki, Inuyama (JP); Sakaru Takahashi, Tokyo (JP)

(73) Assignees: CHOKOKU PLAST CORPORATION, Osaka-shi, Osaka (JP); Hiromichi Inagaki, Inuyama-shi, Aichi (JP)

(*) Notice: Subject to any disclaimer, the term of this patent is extended or adjusted under 35 U.S.C. 154(b) by 802 days.

(21) Appl. No.: 14/902,169

(22) PCT Filed: Jun. 26, 2014

(86) PCT No.: PCT/JP2014/066955
§ 371 (c)(1),
(2) Date: Dec. 30, 2015

(87) PCT Pub. No.: WO2015/002058
PCT Pub. Date: Jan. 8, 2015

(65) Prior Publication Data
US 2016/0152399 A1  Jun. 2, 2016

(30) Foreign Application Priority Data

Jul. 3, 2013 (JP) ................................. 2013-139922

(51) Int. Cl.
*B32B 3/24* (2006.01)
*B65D 81/34* (2006.01)
(Continued)

(52) U.S. Cl.
CPC .......... *B65D 81/3461* (2013.01); *B32B 3/266* (2013.01); *B65D 65/02* (2013.01);
(Continued)

(58) Field of Classification Search
CPC .................. B32B 3/266; Y10T 428/24314
See application file for complete search history.

(56) References Cited

U.S. PATENT DOCUMENTS 7,045,190 B2   5/2006  Inagaki et al.
2013/0142992 A1*  6/2013  Rovelli ............... C09J 7/02
                                                          428/139

FOREIGN PATENT DOCUMENTS

CN      1148309 C       5/2004
EP      1 277 672 A1    1/2003
(Continued)

OTHER PUBLICATIONS

English Translation of Notification Concerning Transmittal of International Preliminary Report on Patentability issued in Application No. PCT/JP2014/066955 dated Jan. 14, 2016 (1 page).
(Continued)

*Primary Examiner* — William P Watkins, III
(74) *Attorney, Agent, or Firm* — Flynn Thiel, P.C.

(57) ABSTRACT

A packaging material is formed of a composite film obtained by bonding a first film formed of a resin film and a second film having a stretch ratio lower than a stretch ratio of the resin film forming the first film or formed of a non-oriented resin film. The first film has a linear cut, a predetermined length in the longitudinal direction of the cut, and a predetermined width in a direction perpendicular to the cut. The packaging material includes a first strongly bonded section in which the first film and the second film are firmly bonded and a first weakly bonded section and a second weakly bonded section provided at both sides of the first strongly bonded section, with the first film and the second film being weakly bonded in the first weakly bonded section and the second weakly bonded section.

10 Claims, 16 Drawing Sheets

(51) Int. Cl.

| | | |
|---|---|---|
| *B65D 77/22* | (2006.01) | |
| *B32B 3/26* | (2006.01) | |
| *B65D 65/02* | (2006.01) | |
| *B65D 79/00* | (2006.01) | |
| *B32B 7/02* | (2019.01) | |
| *B32B 7/12* | (2006.01) | |
| *B32B 27/08* | (2006.01) | |
| *B32B 27/32* | (2006.01) | |
| *B32B 27/34* | (2006.01) | |
| *B32B 3/08* | (2006.01) | |
| *B32B 3/10* | (2006.01) | |

(52) U.S. Cl.
CPC ......... *B65D 77/225* (2013.01); *B65D 79/005* (2013.01); *B32B 3/08* (2013.01); *B32B 3/10* (2013.01); *B32B 7/02* (2013.01); *B32B 7/12* (2013.01); *B32B 27/08* (2013.01); *B32B 27/32* (2013.01); *B32B 27/34* (2013.01); *B32B 2250/02* (2013.01); *B32B 2250/24* (2013.01); *B32B 2255/10* (2013.01); *B32B 2255/26* (2013.01); *B32B 2307/30* (2013.01); *B32B 2307/31* (2013.01); *B32B 2307/514* (2013.01); *B32B 2307/54* (2013.01); *B32B 2307/7244* (2013.01); *B32B 2307/7246* (2013.01); *B32B 2307/732* (2013.01); *B32B 2307/738* (2013.01); *B32B 2435/02* (2013.01); *B32B 2439/46* (2013.01); *B32B 2439/70* (2013.01); *B65D 2205/00* (2013.01); *Y10T 428/24314* (2015.01)

(56) References Cited

FOREIGN PATENT DOCUMENTS

| | | |
|---|---|---|
| JP | H08-091450 A | 4/1996 |
| JP | H11-208736 A | 8/1999 |
| JP | 2002-302165 A | 10/2002 |
| JP | 2011-162261 A | 8/2011 |
| JP | 4 817 583 B2 | 11/2011 |
| WO | WO 01/81201 A1 | 11/2001 |

OTHER PUBLICATIONS

English Translation of Notification of Transmittal of Translation of the International Preliminary Report issued in Application No. PCT/JP2014/066955 dated Jan. 14, 2016 (1 page).

English Translation of International Preliminary Report on Patentability issued in Application No. PCT/JP2014/066955 dated Jan. 5, 2016 (1 page).

Written Opinion of the International Searching Authority with English Translation issued in Application No. PCT/JP2014/066955 dated Sep. 30, 2014 (9 pages).

Search Report attached to Chinese Patent Office's Notification in Chinese Patent Application No. 201480037534.X, dated Feb. 4, 2017 (8 pages).

International Search Report for PCT/JP2014/066955 (2 pgs.).

\* cited by examiner

PACKAGING MATERIAL, PACKAGING BAG, PACKAGING CONTAINER, AND PACKAGED BODY

BACKGROUND OF THE INVENTION

1. Field of the Invention

The present invention relates to a packaging material suitable for a packaging bag or a lid material of a packaging container suitable for heat-treating a processed food and various food materials in a microwave oven or the like, and heat-sterilizing a medical instrument.

2. Description of the Related Art

Various food materials to be heat-treated by a microwave oven in a packaged state are sold. In this case, a food material is often sold as a sealed packaged body sealed and packaged by a packaging material. When such a sealed and package food material is heated in the microwave oven, moisture and the like on the inside of the food material evaporates, the internal pressure of the sealed packaged body rises, the packaging material swells, and, when the food material is further heated, the packaging material bursts.

Therefore, a hole is opened in a part of the packaging material or the packaging material is opened in advance before the heating to prevent the packaging material from bursting. However, it is troublesome to open the hole in the packaging material or open the packaging material before the heating because a tool, such as scissors, is necessary.

There is also a problem in that a user sometimes forgets to open a hole and heats the packaging material.

To solve these problems, there has been proposed a packaging material including a function of automatically forming an opening for discharging water vapor making use of a rise in the internal pressure of a sealed packaged body.

For example, Japanese Patent Publication No. H8-91450 describes a degassing structure for a plastic bag or container in which a first film and a second film, on the entire surface of which micropores are opened, are discontinuously bonded by an adhesive excluding one side end portion, and the outer side and the inner side of a bag are caused to communicate via the micropores and the one side end portion, whereby a passage of gas is provided to exhaust generated steam.

In such a degassing structure, since the bag inside and the outside air communicate, the degassing structure is not considered sealed packaging and it is likely that dust and bacteria intrude into a packaging bag or a packaging container. Since the micropores are opened over the entire surface of the second film, a packaged liquefied food passes through the micropores and comes into direct contact with the adhesive that bonds the second film and the first film. Therefore, there is a problem in that a part of the adhesive melts and mixes into the food.

A packaging film that solves these problems is disclosed in Japanese Patent Publication No. 4817583.

FIG. 14A is a diagram showing a packaging bag 1 formed of the packaging film described in Japanese Patent Publication No. 4817583. FIG. 14B is a diagram of a II-II section of FIG. 14A seen from an arrow direction.

The packaging film is a film obtained by sticking together a first film 2 formed of a stretched film and a second film 3 formed of a non-oriented film. A low-melting point heat seal agent (hereinafter simply referred to as "heat seal agent") 4 is applied to a part of a region of a sticking portion. A cut line 5 passing a place of the first film 2 where a heat seal agent 4 is applied is engraved in the first film 2 of the packaging film. Note that, in FIG. 14A, a longitudinal-direction bonded section 6, lateral-direction bonded sections 7 and 9, and a bag seal end portion b are shown.

When the film is heated in a microwave oven, the heat seal agent 4 is melted by the heat of steam generated from a content 8. Laminate strength between the first film 2 and the second film 3 markedly decreases and the second film 3 softens with the heat. Since the cut line 5 is engraved in the first film 2, when the internal pressure of the bag rises, the second film 3, which is the non-oriented film, in the place where the heat seal agent 4 is applied easily stretches in a direction perpendicular to the direction of the cut line 5. On the other hand, in a portion where the heat seal agent 4 is not applied, the softening of the second film 3 occurs in the same manner. However, since a bonded state is firmly kept with the first film 2 that is hardly softened even if heated by water vapor, the second film 3 cannot easily stretch and expand even though the cut line 5 is engraved in the first film 2. Therefore, a small hole is formed in a crossing point "a" of a boundary portion between the place where the heat seal agent 4 is applied and the place where the heat seal agent 4 is not applied and the cut line 5.

As explained above, in the packaging film described in Japanese Patent Publication No. 4817583, since the second film 3 (the non-oriented film) itself is not particularly processed, a perfect sealed state is kept. Further, the adhesive that bonds the first film 2 (the stretched film) and the second film 3 (the non-oriented film) does not come into contact with the content.

Incidentally, the non-oriented film stretches differently depending on the type of a material. In particular, depending on the type of the non-oriented resin film, some non-oriented films stretch with a weak force when heated and other non-oriented films stretch in a manner called necking in which stretching occurs in one part at a time.

A microwave oven to be used has fluctuations in power depending on the type thereof. The non-oriented film is slowly heated when warmed by a microwave oven having weak power. The pressure in the bag slowly rises. If the internal pressure slowly rises, the non-oriented film is slowly stretched.

In the method described in Japanese Patent Publication No. 4817583 for simply opening a hole in the film in a boundary line between the applied portion of the heat seal agent and the firmly laminated portion, a steam hole sometimes cannot be drilled stably depending on the type of film or because a heating condition changes.

When the packaging film is actually used in the market, since several tens of thousands of foods are sometimes consumed in one day, steam holes need to be stably opened in all the packaging films. However, in particular, in heating by a microwave oven in a home, there are various conditions for consumers to individually perform the heating. Differences in the conditions are factors of instability in opening holes. In the packaging material including the conventional hole opening mechanism described above, the steam hole is sometimes not opened under special conditions and materials to be used are sometimes limited.

SUMMARY OF THE INVENTION

1. Problems to be Solved by the Invention

The present invention has been devised in order to solve the problems explained above and it is an object of the present invention to provide a packaging material suitable for a packaging bag or a lid material of a packaging container, a steam hole being stably opened in the packaging material even under a wide range of heating conditions, irrespective of the type of film in use.

2. Means for Solving the Problems

The inventors completed the present invention directing attention to the fact that it is more effective to provide inhibiting means in a strongly bonded section in order to easily open, while being stretched by a weak force, being adapted to a non-oriented film that causes a necking phenomenon and being adapted to weak microwave oven power, a small hole in a non-oriented film during microwave oven heating.

More specifically, the inventors completed the present invention while finding that the problems can be solved by providing, in a packaging material for a packaging bag or a lid of a packaging container, a packaging material formed of a composite film obtained by bonding a first film formed of a resin film and a second film having a stretch ratio lower than a stretch ratio of the resin film of the first film or formed of a non-oriented resin film, a small hole being opened in a part of a film surface of the second film when a content of the bag is heated in a microwave oven, a linear cut being formed in the first film, a first strongly bonded section in which the first film and the second film are firmly bonded, the first strongly bonded section having a predetermined length in the longitudinal direction of the cut and having a predetermined width in a direction perpendicular to the cut, and a first weakly bonded section and a second weakly bonded section in which the first film and the second film are weakly bonded, the first weakly bonded section and the second weakly bonded section being provided on both sides of the first strongly bonded section, having a predetermined length larger than the length of the first strongly bonded section in the longitudinal direction of the cut, and having a predetermined width in a direction perpendicular to the cut, and providing, in the first strongly bonded section, inhibiting means for inhibiting the second film located in the first strongly bonded section from being stretched until an inner side atmosphere of the composite film reaches a predetermined pressure according to the microwave oven heating.

The present invention for solving the problems is as explained below.

(1) A packaging material for a packaging bag or a lid of a packaging container, the packaging material being formed of a composite film obtained by bonding a first film formed of a resin film and a second film having a stretch ratio lower than a stretch ratio of the resin film forming the first film or formed of a non-oriented resin film, and the packaging material having a function of opening a small hole in a part of a film surface of the second film when a content of the bag is heated by a microwave oven, the first film having a linear cut, the packaging material including:

a first strongly bonded section which has a predetermined length in a longitudinal direction of the cut and has a predetermined width in a direction perpendicular to the cut and in which the first film and the second film are firmly bonded, the first strongly bonded section; and a first weakly bonded section and a second weakly bonded section which are provided on both sides of the first strongly bonded section, have a predetermined length larger than the length of the first strongly bonded section in the longitudinal direction of the cut, have a predetermined width in a direction perpendicular to the cut, and in which the first film and the second film are weakly bonded, the first strongly bonded section being provided with inhibiting means for inhibiting the second film located in the first strongly bonded section from being stretched until an inner side atmosphere of the composite film reaches a predetermined pressure due to heating by the microwave oven.

(2) The packaging material described in (1), wherein the cut has a continuous linear shape, a film piece is joined to the surface of the first film to bridge the first film on both sides of the cut of the first strongly bonded section, and the film piece forms the inhibiting means.

(3) The packaging material described in (1), wherein the linear cut is not provided in the first strongly bonded section, and an uncut section not provided with the linear cut forms the inhibiting means.

(4) The packaging material described in (1), wherein a third weakly bonded section and a fourth weakly bonded section having a shape substantially the same as the shape of the first strongly bonded section are provided on both sides of the first strongly bonded section, a second strongly bonded section and a third strongly bonded section having a shape substantially the same as the shape of the first strongly bonded section are further respectively provided on the outer sides of the third weakly bonded section and the fourth weakly bonded section, the cut has a continuous linear shape and is provided to pass through the first strongly bonded section, and the second strongly bonded section, the third strongly bonded section, the third weakly bonded section, and the fourth weakly bonded section configure the inhibiting means.

(5) The packaging material described in (3), wherein a third weakly bonded section and a fourth weakly bonded section having a shape substantially the same as the shape of the first strongly bonded section are provided on both sides of the first strongly bonded section, a second strongly bonded section and a third strongly bonded section having a shape substantially the same as the shape of the first strongly bonded section are further respectively provided on the outer sides of the third weakly bonded section and the fourth weakly bonded section, and the second strongly bonded section, the third strongly bonded section, the third weakly bonded section, and the fourth weakly bonded section configure the inhibiting means.

(6) The packaging material described in any of (1) to (5), wherein at least one of the first film and the second film has an oxygen and/or water vapor barrier property.

(7) A packaging bag, wherein the packaging material described in any of (1) to (6) is used.

(8) A packaging container, wherein the packaging material described in any of (1) to (6) is used as a lid material.

(9) A packaged body obtained by filling the packaging bag described in (7) with a content thereof containing moisture or a content thereof not containing moisture and moisture, and sealing the packaging bag.

(10) A packaged body obtained by filling the packaging container described in (8) with a content containing moisture or a content not containing moisture and moisture, and sealing the packaging container.

Advantageous Effects of Invention

According to the present invention, it is possible to provide a packaging material suitable for a packaging bag or a lid material of a packaging container, a steam hole being capable of being stably opened in the packaging material even under a wide range of heating conditions, irrespective of the type of film in use.

That is, in the present invention, it is possible to rapidly and intensely apply stress to a fixed place of a non-oriented film and easily open a steam hole while being adapted to a non-oriented film that stretches with a weak force and causes a necking phenomenon and being adapted to weak microwave oven power during heating in the microwave oven.

DETAILED DESCRIPTION OF THE PREFERRED EMBODIMENTS

Embodiments of a packaging material of the present invention are explained below.

Note that, in the following explanation, an example in which the packaging material of the present invention is applied to a packaging bag that stores a food material as a content is explained. However, it is evident for those skilled in the art that the same action and effects are shown when the packaging material of the present invention is used as a lid material of a packaging container.

First Embodiment

The packaging bag of a first embodiment of the present invention is explained with reference to FIG. 1 to FIG. 6.

Figure 1:
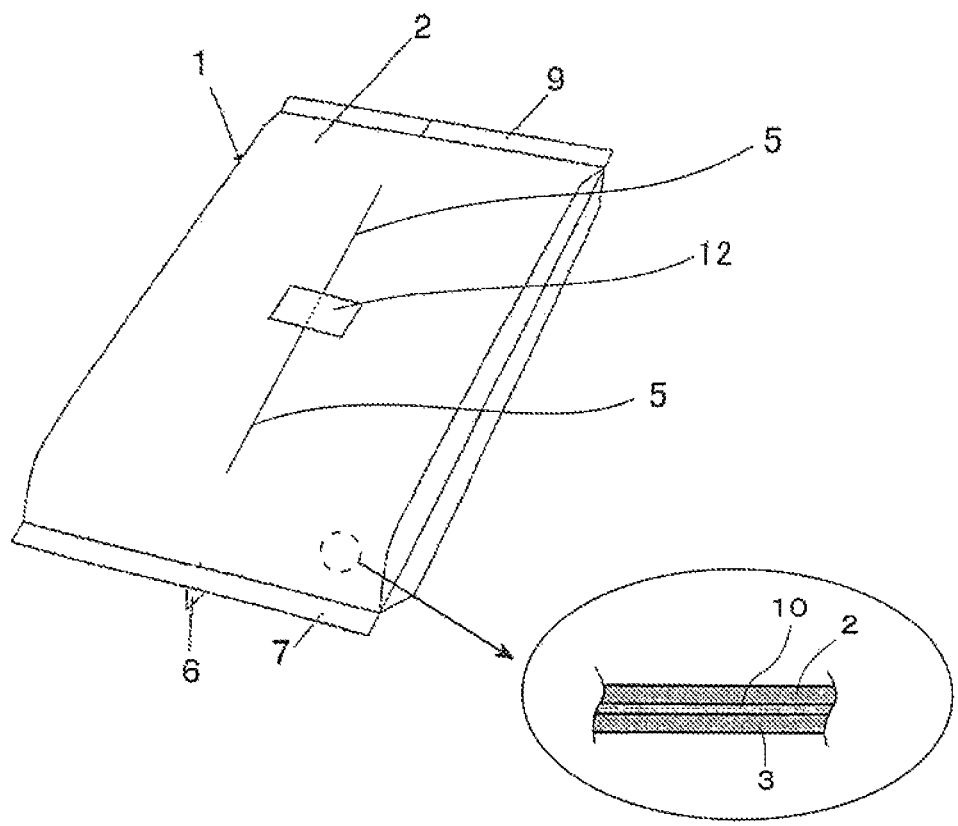
FIG. 1 is a diagram showing a packaging bag of a first embodiment of the present invention.

A general view showing a state in which a content is stored and sealed in a packaging bag 1 of the first embodiment and a partial sectional view of the packaging bag 1 are shown in FIG. 1.

A composite film, which is a material of the packaging bag 1, is formed of a first film 2 formed of a resin film and a second film 3 having a stretch ratio lower than a stretch ratio of the first film 2 or formed of a non-oriented resin film. A linear cut 5 (hereinafter referred to as cut line as well) that cuts the first film 2 is provided in the first film 2.

Note that, in the following explanation, an example in which the non-oriented resin film is used as the second film 3 is explained.

The packaging bag 1 shown in FIG. 1 includes a longitudinal-direction bonded section 6 and lateral-direction bonded sections 7 and 9.

Bonding of the first film 2 and the second film 3 may be performed using an adhesive or may be performed by a method of not using an adhesive. In this embodiment, the first film 2 and the second film are bonded by an adhesive 10.

As the first film 2, a biaxially oriented film can be used. As the second film 3, a non-oriented film enabling heat sealing of second films 3 can be used. The packaging bag 1 is formed by heat sealing of second films 3 to be the inner side of a bag.

The biaxially oriented film is a film stretched in two axial directions. The biaxially oriented film hardly softens at 150° C. or less.

Examples of the biaxially oriented film include a biaxially oriented polyester film, a biaxially oriented polyacetate film, and a biaxially oriented polypropylene film.

The non-oriented film is a film not stretched. The non-oriented film is softened at a relatively low temperature.

Examples of the non-oriented film include a non-oriented polyethylene film and a non-oriented polypropylene film, which are films that are softened at a temperature of, in particular, approximately 60 to 100° C. and are easily stretched.

As a specific example of the first film 2 and the second film 3, for example, a polyester film (12 μm thick) can be used as the first film 2 and a polyethylene film (40 μm thick) can be used as the second film 3.

In order to protect the bag content from oxygen and/or humidity, it is desirable to use a film having a barrier property against oxygen and/or water vapor as at least one of the first film 2 and the second film 3. It is more desirable to use the film having the barrier property against oxygen and/or water vapor as both of the first film 2 and the second film 3. In the present invention, since a cut line is not applied to the second film 3, a further barrier effect can be expected.

Figure 2A:
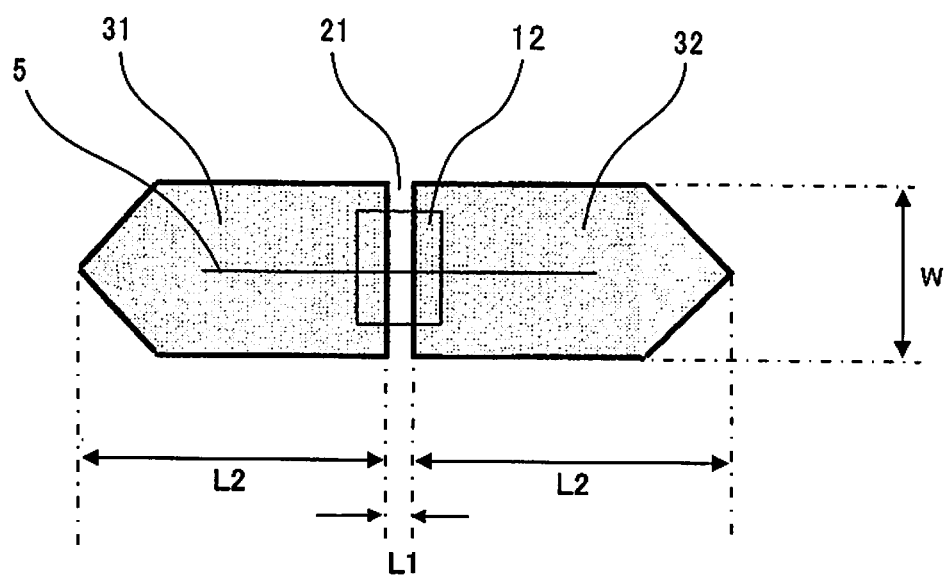
FIG. 2A is a schematic diagram showing a hole opening mechanism of a packaging bag shown in FIG. 1.
Figure 2B:
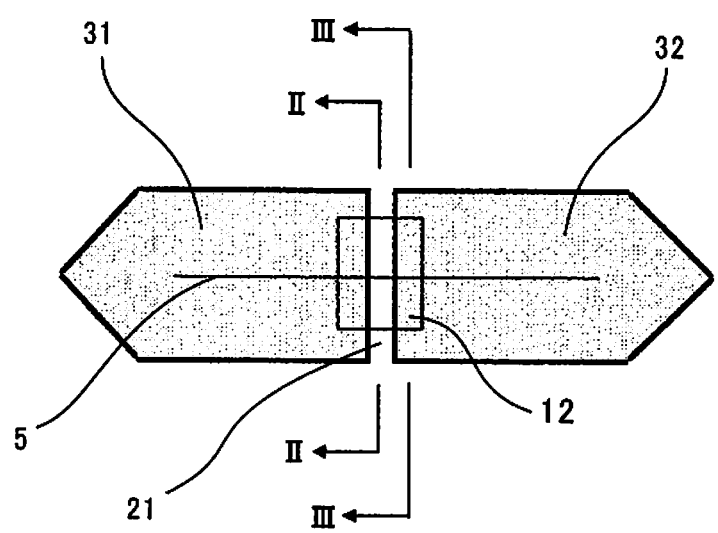
FIG. 2B is a schematic diagram showing the hole opening mechanism of the packaging bag shown in FIG. 1.

FIG. 2A and FIG. 2B are schematic diagrams showing the composite film hole opening mechanism of the first embodiment in a transparent state from the outer side of the composite film.

Portions indicated by hatching in FIG. 2A indicate weakly bonded sections in which the first film 2 and the second film 3 are bonded in a weakly bonded state. A portion without hatching indicates a strongly bonded section in which the first film 2 and the second film 3 are bonded in a strongly bonded state. Note that the weakly bonded sections and the strongly bonded section have different states of bonding and difference between the weakly bonded sections and the strongly bonded section cannot always be visually confirmed. The entire section other than the weakly bonded portions of the composite film is the strongly bonded section. A strongly bonded section between a weakly bonded section 31 and a weakly bonded section 32 shown in FIG. 2A is referred to as strongly bonded section 21 in particular.

FIG. 2A is a diagram showing an example of the shapes of the respective regions of the strongly bonded section 21 and the weakly bonded sections 31 and 32. FIG. 2B is a diagram showing the direction of cut lines (II-II and III-III) for giving sectional shapes shown in FIG. 3 and FIG. 4.

As shown in FIG. 2A, the strongly bonded section 21 has width (W) of a predetermined dimension in a direction perpendicular to the cut line 5 and has length (L1) of a predetermined dimension in the longitudinal direction of the cut line 5.

The first weakly bonded section 31 and the second weakly bonded section 32 is formed to sandwich the strongly bonded section 21 in the longitudinal direction of the cut line 5. The first weakly bonded section 31 and the second weakly bonded section 32 have a width (W) the same as the width of the strongly bonded section 21 and has a length (L2) larger than the length (L1) of the strongly bonded section 21. L1:L2:W is desirably set to, for example, 1:4:3.

Figure 3:
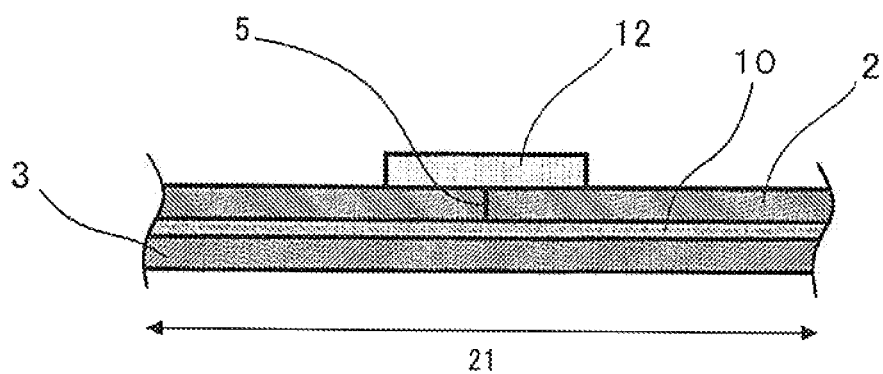
FIG. 3 is a partial sectional view of the II-II section of FIG. 2B viewed from an arrow direction.
Figure 4:
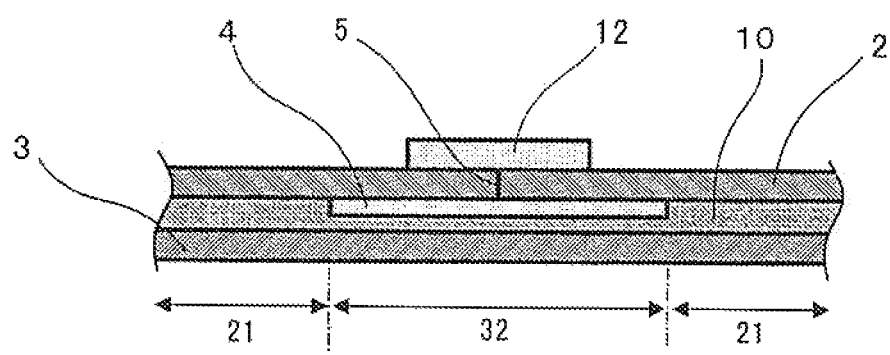
FIG. 4 is a partial sectional view of the III-III section of FIG. 2B viewed from an arrow direction.

FIG. 3 is a sectional view of the II-II section of the film hole opening mechanism shown in FIG. 2B viewed from an arrow direction. FIG. 4 is a sectional view of the III-III section of the film hole opening mechanism shown in FIG. 2B viewed from an arrow direction.

As shown in FIG. 3 and FIG. 4, the strongly bonded section 21 is formed by bonding the first film 2 and the second film 3 using the adhesive 10.

Since the adhesive 10 is applied to the second film 3 and weak adhesiveness is given to the surface of the adhesive 10, the first weakly bonded section 31 and the second weakly bonded section 32 can be formed by applying a heat seal agent 4 and bonding the first film 2 and the second film 3. In a region where the heat seal agent 4 is applied, since the heat seal agent 4 has an effect of weakening the bonding of the first film 2 and the second film 3, the bonding is in a weakly bonded state.

In this embodiment, the cut line 5 is provided to pass through the strongly bonded section 21. A film piece 12 is joined to the surface of the first film 2 by an adhesive to bridge the first film on both sides of a cut of the strongly bonded section 21.

In this embodiment, since the film piece 12 is joined to bridge the first film on both sides of the cut, the film piece 12 functions as inhibiting means for inhibiting the first film 2 from opening in a direction perpendicular to the cut line 5 even if the internal pressure of the packaging bag rises. That is, the film piece 12 inhibits the second film 3 from being stretched even if the internal pressure of the packaging bag rises.

A food containing moisture is stored in the packaging bag 1 configured in this way and the packaging bag 1 is sealed by heat sealing. In the following explanation, the packaging bag 1 in this state is heated for a predetermined time in a microwave oven.

When the packaging bag 1 is heated by the microwave oven, the food, which is a content of the bag 1, is warmed and steam is generated. The internal pressure of the packaging bag starts to rise, the entire packaging bag swells, and the temperature of the packaging bag 1 rises with the generated steam. Therefore, the temperature of the second film 3 also rises, softening of the second film 3 starts, and the second film 3 changes to a state in which the second film 3 can be stretched with a weak stretching force. Since the cut line 5 is provided in the first film 2, a cut section can open in a direction perpendicular to the longitudinal direction of the cut section. Further, since the heat seal agent 4 is applied to the first weakly bonded section 31 and the second weakly bonded section 32, when the temperature of the packaging bag 1 rises, the heat seal agent melts, and the first weakly bonded section 31 and the second weakly bonded section 32 change to a state in which the first weakly bonded section 31 and the second weakly bonded section 32 are not bonded.

Therefore, as the packaging bag 1 swells and the internal pressure rises, at the place of the cut section located in the first weakly bonded section 31 and the second weakly bonded section 32, the second film 3 greatly stretches in the direction perpendicular to the longitudinal direction of the cut line 5 according to tensile stress applied to the film.

Since a portion where the second film 3 stretches is necessary, the respective lengths (L2) and the respective widths (W) of the strongly bonded section 21, the first weakly bonded section 31, and the second weakly bonded section 32 are determined to reach predetermined dimensions according to the type and thickness of the second film 3. At this point, when the length (L2) of the first weakly bonded section 31 and the second weakly bonded section 32 is sufficiently larger than the length (L1) of the strongly bonded section 21, the second film 3 can be easily stretched.

Figure 5:
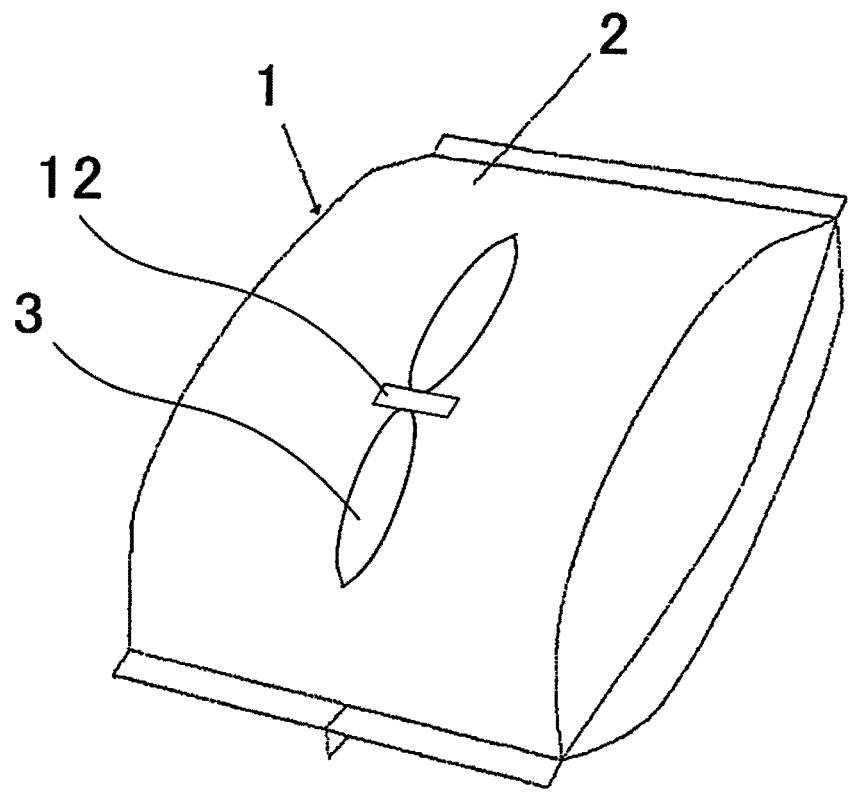
FIG. 5 is a diagram showing a state in which a packaging bag of the first embodiment of the present invention is heated in a microwave oven.

At this point, as shown in FIG. 5, since the film piece 12, which is the inhibiting means, is joined to a substantially center portion of the cut line provided in the first film 2, the cut section cannot be opened. Therefore, the second film 3 in the cut section cannot stretch.

Figure 6:
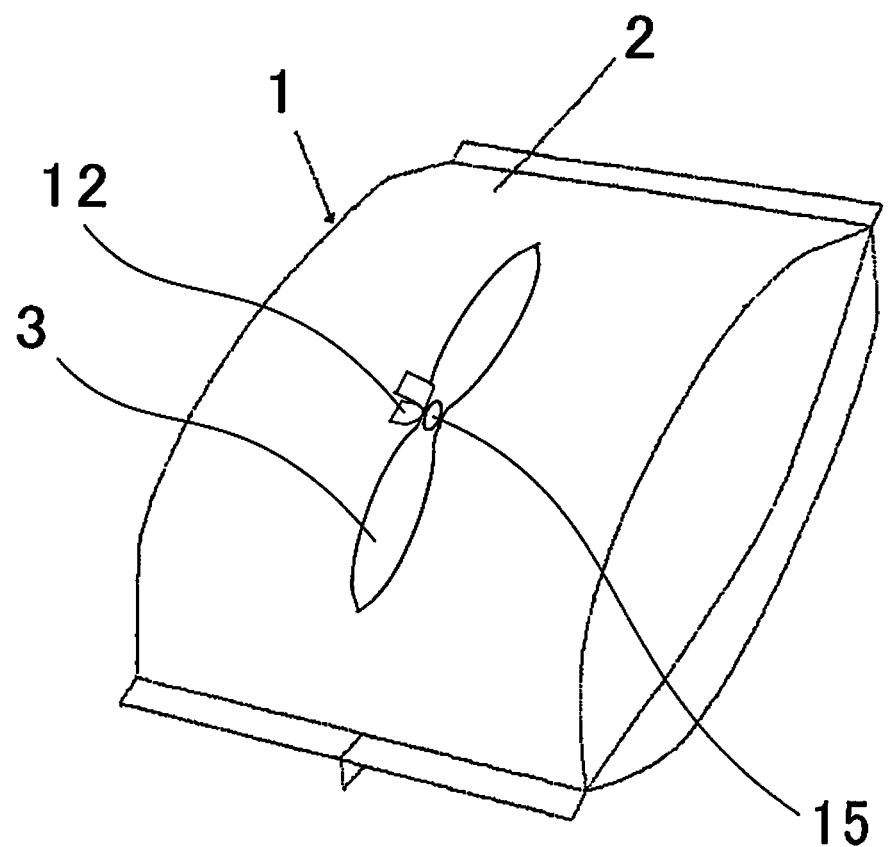
FIG. 6 is a diagram showing a state in which the packaging bag shown in FIG. 5 is further heated in the microwave oven.

When the packaging bag 1 is further heated from this state, the rise in the internal pressure continues. When the internal pressure exceeds a fixed pressure, as shown in FIG. 6, the joining of the film piece 12 and the first film 2 peels and the film piece 12 does not function as the inhibiting means. Therefore, the cut section to which the film piece 12 is joined can open in the direction perpendicular to the cut line 5. At this point, since the pressure inside the packaging bag is sufficiently high, a strong tensile stress is rapidly and intensely applied to the second film 3 located in the cut section to which the film piece 12 is joined. Consequently, the second film 3 is rapidly and intensely stretched.

A film made of resin has a characteristic in that the film is ruptured when being rapidly and intensely stretched. Therefore, the second film 3 cannot withstand this rapid and intense tensile stress and causes a rupture. A small hole 15 opens, steam is discharged from the small hole 15, and the internal pressure of the packaging bag 1 falls.

Figure 7:
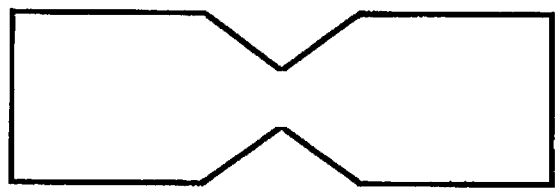
FIG. 7 is a diagram showing an example of a film piece used in the packaging bag of the first embodiment of the present invention.

Note that, in the example shown in FIG. 1, a rectangular film piece is used as the film piece 12 and joined by the adhesive. However, as shown in FIG. 7, the film piece 12 may be formed in an hourglass shape having a constriction portion and firmly joined to the first film 2 so as not to peel off from the first film 2. In this case, when the internal pressure of the packaging bag 1 sufficiently rises, the constriction portion of the film piece 12 ruptures, whereby the film piece 12 does not function as the inhibiting means and the small hole 15 opens.

In this way, by changing the shape of the film piece 12, changing the thickness and the material of the film piece 12, and the strength of the join with the first film 2, it is possible to adjust the tensile stress, that is, the internal pressure of the packaging bag 1 at the time when the function of the inhibiting means is disabled. Consequently, it is possible to set internal pressure necessary for opening the small hole 15 corresponding to the material and the thickness of the second film 3.

Second Embodiment

A packaging bag of a second embodiment of the present invention is explained with reference to FIG. 8 to FIG. 11.

Figure 8:
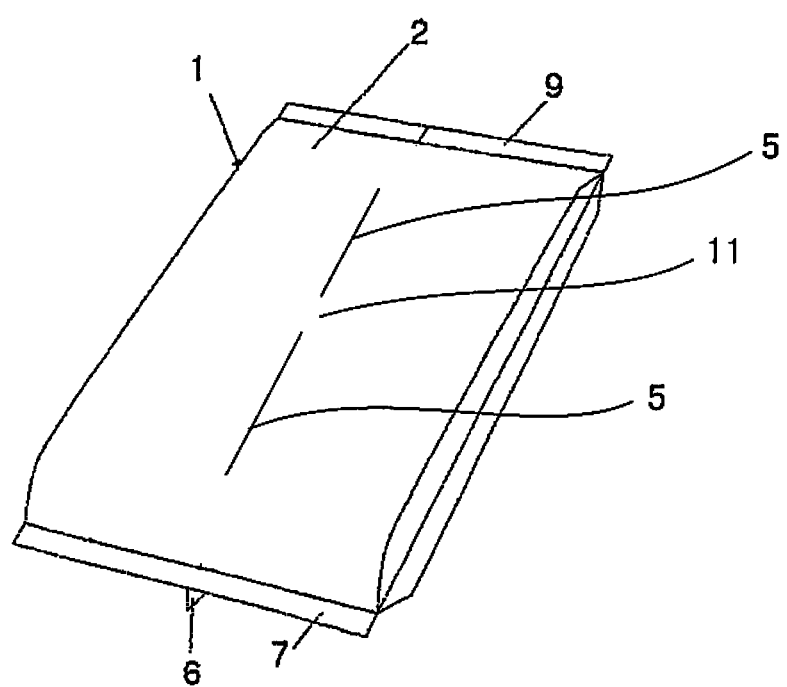
FIG. 8 is a diagram showing a packaging bag of a second embodiment of the present invention.

FIG. 8 is an overall diagram showing a state in which a content is stored in the packaging bag 1 of this embodiment and the packaging bag 1 is sealed.

Like the packaging bag 1 of the first embodiment, the packaging bag of this embodiment is formed by a composite film including the first film 2, the second film 3, and the adhesive 10. As in the first embodiment, a film hole opening mechanism includes a strongly bonded section 21, the first weakly bonded section 31, and the second weakly bonded section 32.

In this embodiment, two linear cut lines 5 that cut the linear first film 2 are provided in the first film 2. An uncut section 11 in which a cut is not provided is present between the two cut lines. The packaging bag 1 shown in FIG. 8 includes the longitudinal-direction bonded section 6 and the lateral-direction bonded sections 7 and 9.

Figure 9:
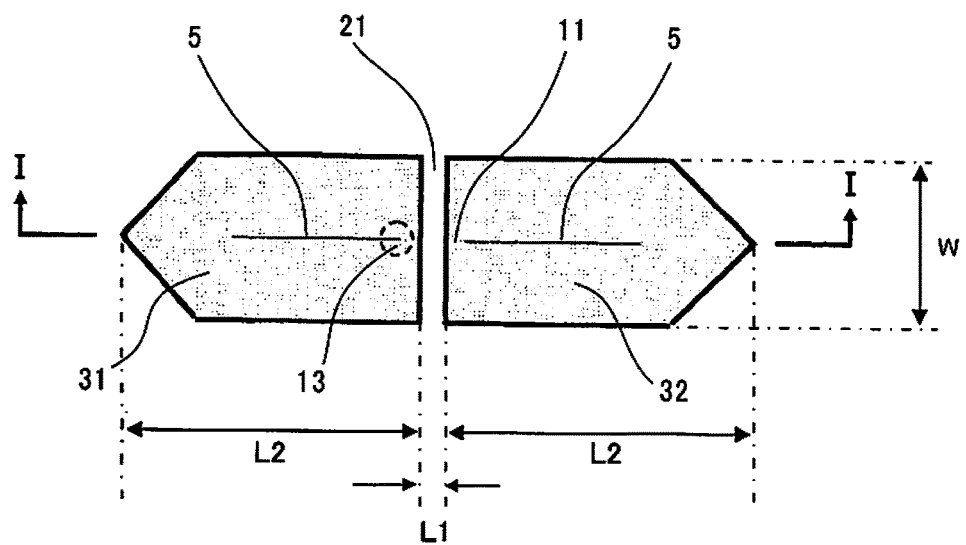
FIG. 9 is a schematic diagram showing a hole opening mechanism of the packaging bag shown in FIG. 8.

FIG. 9 is a schematic diagram showing, in a transparent state from the outer side of the composite film, a structure of a portion where an open hole of the composite film of the second embodiment is formed (hereinafter referred to as hole opening mechanism as well).

As explained in the first embodiment, the strongly bonded section 21 is bonded by the adhesive 10 with which the first film 2 and the second film 3 form a strongly bonded state. The strongly bonded section 21 has a width (W) of a predetermined dimension in the direction perpendicular to the cut line 5 and has a length (L1) of a predetermined dimension in the longitudinal direction of the cut line 5.

The first weakly bonded section 31 and the second weakly bonded section 32 are formed to sandwich the strongly bonded section 21 in the longitudinal direction of the cut line 5. The first weakly bonded section 31 and the second weakly bonded section 32 have a width (W) the same as the width of the strongly bonded section 21 and have a length (L2) longer than the length (L1) of the strongly bonded section 21.

As shown in FIG. 9, the cut line 5 does not pass the strongly bonded section 21. A part of a region including the strongly bonded section 21 is in an uncut state and configures the uncut section 11.

Figure 10:
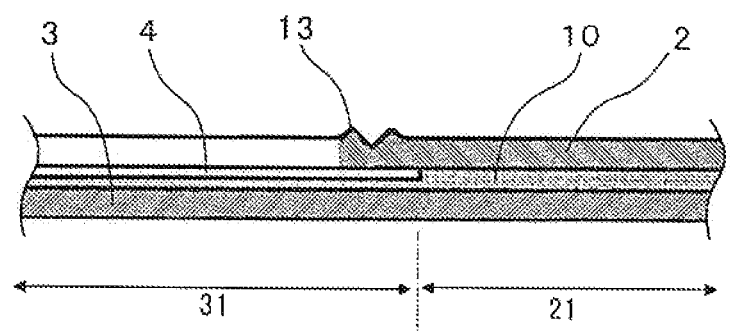
FIG. 10 is a partial sectional view of the I-I section of FIG. 9 viewed from an arrow direction.

FIG. 10 is a sectional view of a I-I section of an end portion of the cut line 5 shown in FIG. 9 viewed in an arrow direction.

In the section shown in FIG. 10, bank sections 13 where the thickness of the first film 2 is increased by irradiating a laser beam on end portions of cut sections located at both ends of the uncut section 11 to melt a part of the end portions are provided. A technical meaning of providing the bank sections 13 is explained below.

The packaged body of the present invention is obtained by storing a food containing moisture in the packaging bag 1 configured in this way and sealing the packaging bag 1 by heat sealing.

In the following explanation, the packaged body in this state is heated for a predetermined time in a microwave oven.

When the packaged body is heated in the microwave oven for the predetermined time, the food, which is a content thereof, is warmed and steam is generated. The internal pressure of the bag rises, the entire packaging bag swells, and the temperature of the packaging bag 1 rises with the generated steam. Therefore, the temperature of the second film 3 also rises, softening of the second film 3 starts, and the second film 3 changes to a state in which the second film 3 can be stretched according to the tensile stress. Since the cut line 5 is provided in the first film 2, a cut section can open in a direction perpendicular to the longitudinal direction of the cut line 5. Further, since the heat seal agent 4 is applied to the first weakly bonded section 31 and the second weakly bonded section 32, when the temperature of the packaging bag 1 rises, the heat seal agent 4 melts, and the first weakly bonded section 31 and the second weakly bonded section 32 change to a state in which the first weakly bonded section 31 and the second weakly bonded section 32 are not bonded.

According to these phenomena, as the packaging bag 1 swells and the internal pressure rises, in the place of the cut section located in the first weakly bonded section 31 and the second weakly bonded section 32, the second film 3 greatly stretches in the direction perpendicular to the longitudinal direction of the cut line 5 according to the tensile stress applied to the film.

At this point, the uncut section 11 is present between the two cut lines 5 and 5. The uncut section 11 functions as inhibiting means for inhibiting the first film 2 from opening in the direction perpendicular to the cut line 5. Therefore, the second film 3 located in the uncut section cannot stretch.

When the packaging bag 1 is further heated from this state, the rise in the internal pressure continues. When the inner side atmosphere of the packaging bag 1 reaches a predetermined pressure, the uncut section 11 cannot withstand the tensile stress and is eventually cut, then loses the function of the inhibiting means. When the uncut section 11 is cut, the first film 2 can open in the direction perpendicular to the cut line. At this point, since the pressure inside the packaging bag is sufficiently high, strong tensile stress is rapidly and intensely applied to the second film 3 located in the portion. Consequently, the second film 3 near the uncut section 11 is rapidly and intensely stretched.

The second film 3 cannot withstand the rapid and intense tensile stress and causes a rupture. A small hole opens, steam is discharged from the small hole, and the internal pressure of the packaging bag falls.

To form the small hole at a stage when the content is sufficiently heated, it is necessary to appropriately adjust the tensile stress necessary for rupturing the uncut section 11 according to the type of the material of the first film 2.

The tensile stress necessary for rupturing the uncut section 11 can be adjusted by changing the length of the uncut section and the shape of the strongly bonded section 21. The tensile stress can also be adjusted by changing the thickness of the bank sections 13. The thickness of the bank sections 13 can be adjusted by controlling the power of the laser irradiation. The bank sections 13 are provided according to necessity. It is sometimes unnecessary to provide the bank sections 13 on both the sides of the uncut section 11 depending on the material and the content of the packaging bag 1.

In the example explained above, the first film 2 and the second film 3 are bonded using the adhesive layer formed by the adhesive 10. However, the bonding may be performed by any method as long as the first film 2 and the second film 3 can be firmly bonded, and if the firm bonding is implemented, an adhesive layer can be omitted.

As a method of forming the weakly bonded sections (31, 32), the example in which the heat seal agent 4 is used on the surface of the adhesive is explained. However, other methods may be used as long as the weakly bonded sections are bonded in a state of weak bonding with respect to the strongly bonded section 21.

For example, an adhesive having a strong adhesive property may be used for the strongly bonded section 21 and an adhesive having a weak adhesive property may be used for the weakly bonded sections (31, 32) to bond the first film 2 and the second film 3 and form the strongly bonded section 21 and the weakly bonded sections (31, 32).

Figure 11:
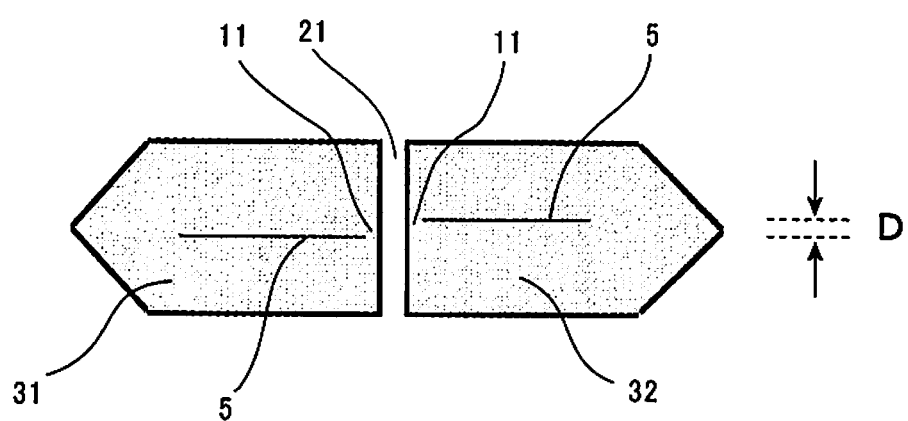
FIG. 11 is a schematic diagram showing the hole opening mechanism in the case in which a level difference is provided in a cut line in the packaging bag shown in FIG. 8.

Further, in the packaging bag 1 shown in the figures, the cut line 5 is formed in the linear shape. However, the shape of the cut line 5 is not limited as long as the cut section opens when the internal pressure is applied. In the cut line 5, a level difference D may be provided via the uncut section as shown in FIG. 11.

Third Embodiment

A packaging bag of a third embodiment of the present invention is explained with reference to FIG. 12.

Figure 12:
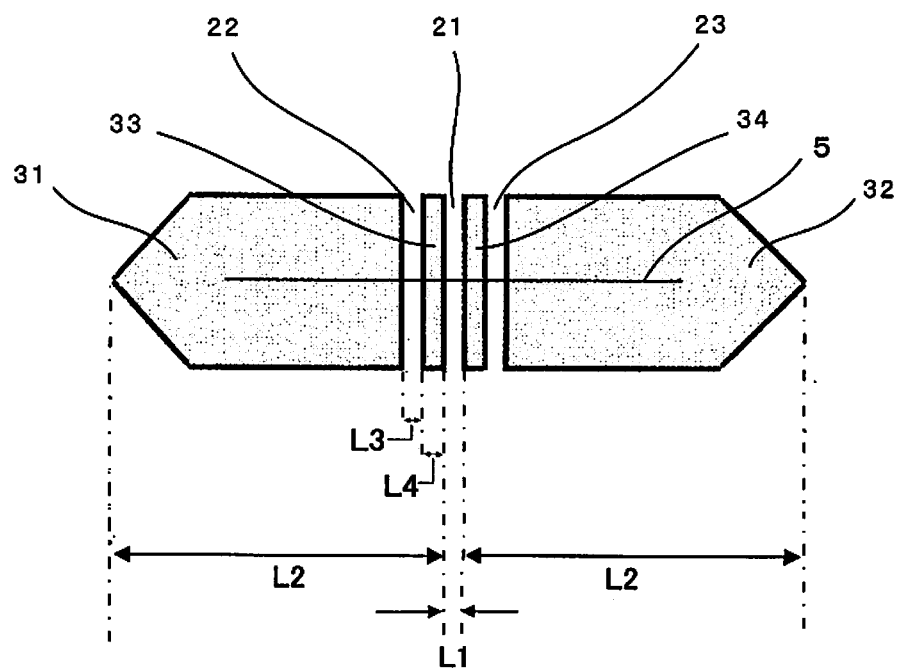
FIG. 12 is a schematic diagram showing a hole opening mechanism of a packaging bag of a third embodiment of the present invention.

FIG. 12 is a schematic diagram showing a film hole opening mechanism of the third embodiment of the present invention viewed from the outer side of the composite film in a transparent state.

In FIG. 12, the materials, the positional relation, and the roles of the first film 2, the second film 3, the cut line 5, the first weakly bonded section 31, the second weakly bonded section 32, and the adhesive layer are the same as those in the first embodiment.

In this embodiment, a third weakly bonded section 33 and a fourth weakly bonded section 34 having a length L4 applied with a heat seal agent in a shape substantially equal to the first strongly bonded section 21 formed in the rectangular shape are provided on both sides in the longitudinal direction of the cut line of the first strongly bonded section 21. A second strongly bonded section 22 having a length L3 formed in a shape substantially the same as the shape of the third weakly bonded section 33 is provided between the first weakly bonded section 31 and the third weakly bonded section 33. A third strongly bonded section 23 having a length L3 formed in a shape substantially the same as the fourth weakly bonded section 34 is provided between the fourth weakly bonded section 34 and the second weakly bonded section 32.

In this embodiment, the second strongly bonded section 22, the third strongly bonded section 23, the third weakly bonded section 33, and the fourth weakly bonded section 34 function as inhibiting means in cooperation with one another.

L1:L2:L3:L4 is desirably set to, for example, 1:6:1:1.

In the following explanation, a packaged body obtained by housing a food containing moisture in the packaging bag, which is created using the packaging material including the hole opening mechanism of this embodiment, and sealing the packaging bag is heated in a microwave oven.

When the packaged body is heated in the microwave oven, as explained in the first embodiment and the second embodiment, the internal pressure of the bag rises and the second film 3 of the first weakly bonded section 31 and the second weakly bonded section 32 can greatly stretch in the direction perpendicular to the longitudinal direction of the cut line 5.

In this embodiment, since the second strongly bonded section 22 and the third strongly bonded section 23 are present on both sides of a cut section located in the vicinity of the first strongly bonded section 21, the cut section cannot open in the direction perpendicular to the longitudinal direction. Therefore, the second film 3 in the vicinity of the first strongly bonded section 21 cannot stretch either. Further, a tensile stress is applied to the film, whereby the second and third strongly bonded sections peel, the function of the inhibiting means is lost, and the second film 3 starts to stretch. At this point, since the third and fourth weakly bonded sections are present, the second film 3 in the vicinity is greatly stretched and even a slight peeling of the second and third strongly bonded sections. Consequently, rapid and intense tensile stress is applied to the place in the second film 3 located in the first strongly bonded section 21. At this point, since a sufficient tensile stress is applied to the entire film, the portion of the second film 3 located in the first strongly bonded section 21 causes a rupture and a small hole opens.

When the packaging bag is configured in this way, adjustment of the internal pressure of the bag at the time when the inhibiting means loses the inhibiting function thereof can be easily performed by changing the shape (length, width) and bonding strength of the second strongly bonded section 22 and the third strongly bonded section 23 or changing the shape and the bonding strength of the third weakly bonded section 33 and the fourth weakly bonded section 34.

Fourth Embodiment

A fourth embodiment of the present invention is explained with reference to FIG. 13.

Figure 13:
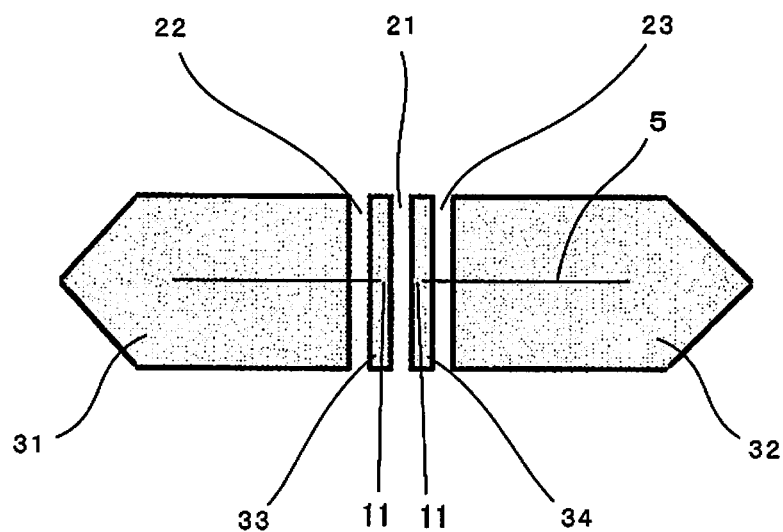
FIG. 13 is a schematic diagram showing a hole opening mechanism of a packaging bag of a fourth embodiment of the present invention.

FIG. 13 is a schematic diagram showing a film hole opening mechanism of the fourth embodiment in a transparent state from the outer side of a composite film.

In the film hole opening mechanism of this embodiment, the cut line 5 is not provided in the first strongly bonded section 21 and the first strongly bonded section 21 is formed as the uncut section 11 in the third embodiment.

In this embodiment, the uncut section 11 provided in the cut section, which is one of the components of the film hole opening mechanism in the second embodiment, the second strongly bonded section 22, the third strongly bonded section 23, the third weakly bonded section 33, and the fourth weakly bonded section 34, which are some of the components of the film hole opening mechanism in the third embodiment, are provided. Therefore, in this embodiment, since the respective effects explained in the second and third embodiments are obtained, it is possible to easily perform adjustment of the internal pressure of the bag at the time when the inhibiting means loses the function.

EXAMPLES

The present invention is explained in more detail below with reference to examples. However, the technical scope of the present invention is not limited by the examples.

Example 1

A nylon film having a thickness of 15 μm was used as the stretched film (an outer side material) and a polyethylene film having a thickness of 50 pin was used as the non-oriented film (an inner side material, a sealant) to manufacture the packaging bag shown in FIGS. 1 to 7 and the first embodiment was verified. As the polyethylene film, a polyethylene film of a type that stretches less easily during microwave oven heating (hereinafter referred to as "type A") and a polyethylene film of a type that easily stretches with a weak force during the microwave oven heating (hereinafter referred to as "type B") were used. The size of the packaging bag was 100 mm×200 mm.

As the film piece, a polyester film of 10 mm×20 mm×25 μm was used. The film piece was stuck to the packaging bag using, as an adhesive, a silylated urethane-based resin (Ultra Multipurpose S U manufactured by Konishi Co., Ltd.).

For testing purposes, four pieces of tissue paper (Nepia manufactured by Oji Paper Co., Ltd.) were immersed in tap water and the tissue paper having a moisture content of 10 to 40 cc was packaged as a content.

The packaging bag was placed in a microwave oven (EMO-MRI(HL) type manufactured by Sanyo Electric Co., Ltd., high-frequency power: 500 W, a turntable diameter: 300 mm) and heated. A state was verified in which steam was generated according to the heating, the internal pressure rose, and in due course the small hole 15 opened in the non-oriented film. In this case, the moisture content of the packaged body was changed and the time until the small hole opened was measured.

The result was as shown in Table 1.

TABLE 1

| Packaging bag size (mm) | Sealant | Sealant thickness | Moisture content (g) | Time until the small hole opened (second) | Small hole state |
|---|---|---|---|---|---|
| 100*200 | Type A | 50 μm | 10 | 15 | Good |
|  |  |  | 20 | 22 | Good |
|  |  |  | 30 | 31 | Good |
|  |  |  | 40 | 33 | Good |
| 100*200 | Type B | 50 μm | 10 | 17 | Good |
|  |  |  | 20 | 25 | Good |
|  |  |  | 30 | 32 | Good |
|  |  |  | 40 | 32 | Good |

In the table, "Good" of the small hole state refers to a state in which the small hole opens in the non-oriented film as expected and an inner water vapor is stably discharged to the outside of the packaging bag while the internal pressure inside the packaging bag is stably kept.

Example 2

A packaging bag the same as the packaging bag manufactured in Example 1 was used.

However, two cut lines are provided on both sides of the strongly bonded section 21. An uncut section in which a cut is not provided is present between the two cut lines.

A nylon film having a thickness of 15 μm was used as the stretched film (the outer side material) and a polyethylene film having a thickness of 50 μm was used as the non-oriented film (the inner side material) to manufacture the packaging bag shown in FIGS. 8 and 9 and the second embodiment was verified. As the polyethylene film, the type A that stretches less easily during microwave oven heating and the type B that easily stretches with a weak force during the microwave oven heating were used. The size of the packaging bag was 100 mm×200 mm.

A test was performed as in Example 1.

The test result was as shown in Table 2.

TABLE 2

| Packaging bag size (mm) | Sealant | Sealant thickness | Moisture content (g) | Time until the small hole opened (second) | Small hole state |
|---|---|---|---|---|---|
| 100*200 | Type A | 50 μm | 10 | 16 | Good |
|  |  |  | 20 | 23 | Good |
|  |  |  | 30 | 32 | Good |
|  |  |  | 40 | 33 | Good |
| 100*200 | Type B | 50 μm | 10 | 17 | Good |
|  |  |  | 20 | 23 | Good |
|  |  |  | 30 | 33 | Good |
|  |  |  | 40 | 32 | Good |

Example 3

A nylon film having a thickness of 15 μm was used as the stretched film (the outer side material) and a polyethylene film having a thickness of 50 μm was used as the non-oriented film (the inner side material) to manufacture the packaging bag shown in FIG. 12 and the third embodiment was verified. As the polyethylene film, the type A that stretches less easily during microwave oven heating and the type B that easily stretches with a weak force during the microwave oven heating were used. The size of the packaging bag was 100 mm×200 mm.

A test was performed as in Example 1 using the packaging bag.

The test result was as shown in Table 3.

TABLE 3

| Packaging bag size (mm) | Sealant | Sealant thickness | Moisture content (g) | Time until the small hole opened (second) | Small hole state |
|---|---|---|---|---|---|
| 100*200 | Type A | 50 μm | 10 | 15 | Good |
|  |  |  | 20 | 21 | Good |
|  |  |  | 30 | 33 | Good |
|  |  |  | 40 | 34 | Good |
| 100*200 | Type B | 50 μm | 10 | 15 | Good |
|  |  |  | 20 | 25 | Good |
|  |  |  | 30 | 32 | Good |
|  |  |  | 40 | 35 | Good |

Example 4

A packaging bag same as the packaging bag in Example 3 except that the cut line 5 was not provided in the first strongly bonded section was manufactured and the fourth embodiment was verified.

A test was performed as in Example 1 using the packaging bag.

The test result was as shown in Table 4.

TABLE 4

| Packaging bag size (mm) | Sealant | Sealant thickness | Moisture content (g) | Time until the small hole opened (second) | Small hole state |
|---|---|---|---|---|---|
| 100*200 | Type A | 50 μm | 10 | 15 | Good |
|  |  |  | 20 | 23 | Good |
|  |  |  | 30 | 30 | Good |
|  |  |  | 40 | 33 | Good |
| 100*200 | Type B | 50 μm | 10 | 16 | Good |
|  |  |  | 20 | 24 | Good |
|  |  |  | 30 | 31 | Good |
|  |  |  | 40 | 32 | Good |

Comparative Example 1

Figure 14A:
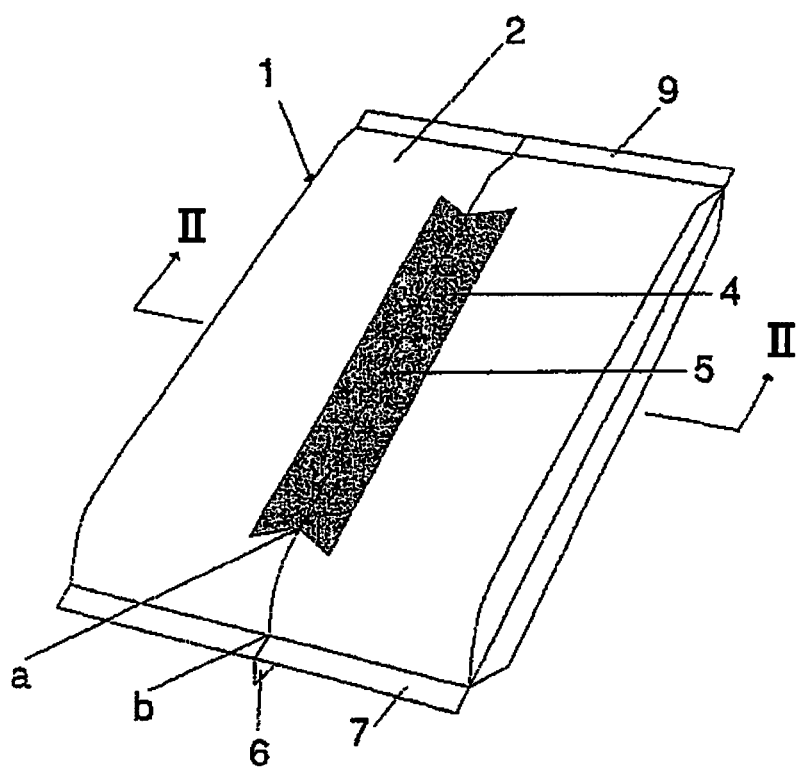
FIG. 14A is a diagram showing a conventional packaging bag.
Figure 14B:
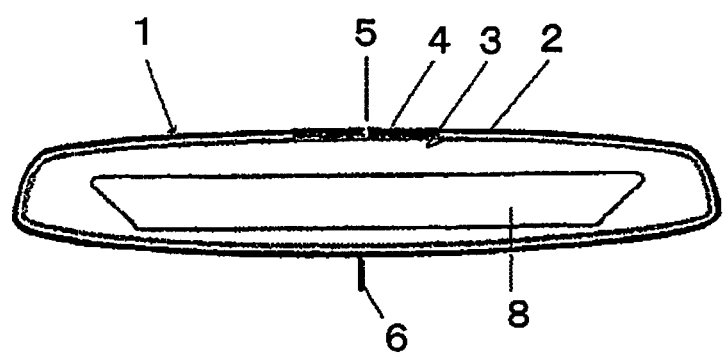
FIG. 14B is a diagram of the II-II section of the packaging bag shown in FIG. 14A viewed from an arrow direction.

As a comparative example, a packaging bag formed by a structure described in Japanese Patent Publication No. 4817583 shown in FIG. 14A and not provided with inhibiting means was used, a film configuration, a bag size, and a microwave oven the same as those in Examples 1 to 4 were applied, and a state in which a small hole opened in the microwave oven was verified.

A nylon film having a thickness of 15 μm was used as the stretched film (the outer side material) and a polyethylene film having a thickness of 50 μm was used as the non-oriented film (the inner side material) to manufacture the packaging bag shown in FIG. 1 (the film piece 12 was absent). As the polyethylene film, the type A that stretches less easily during microwave oven heating and the type B that easily stretches with a weak force during the microwave oven heating were used. The size of the packaging bag was 100 mm×200 mm.

The test result was as shown in Table 5.

Unlike Examples 1 to 4, with the polyethylene film of the type A, a small hole, which was a steam hole, or a larger hole stably opened in the non-oriented film. However, with the polyethylene film of the type B, the bag ruptured.

According to this comparative verification, it was found that, in the present invention, in both the cases of the type A that stretches less easily during the microwave oven heating and the type B that easily stretches with a weak force during the microwave oven heating, the steam hole can be stably opened and, on the other hand, in the structure of the packaging bag described in Japanese Patent Publication No. 4817583, the steam hole cannot be stably opened, in particular, in the latter case.

TABLE 5

| Packaging bag size (mm) | Sealant | Sealant thickness | Moisture content (g) | Time until the small hole opened (second) | Small hole state |
|---|---|---|---|---|---|
| 100*200 | Type A | 50 μm | 10 | 15 | Fair |
|  |  |  | 20 | 24 | Fair |
|  |  |  | 30 | 32 | Good |
|  |  |  | 40 | 34 | Good |
| 100*200 | Type B | 50 μm | 10 | 16 | Bad |
|  |  |  | 20 | 25 | Bad |
|  |  |  | 30 | 32 | Bad |
|  |  |  | 40 | 32 | Bad |

In the table, "Good" of the small hole state refers to a state in which the small hole opens in the non-oriented film as expected and inner water vapor is stably discharged to the outside of the packaging bag while the internal pressure inside the packaging bag is stably kept.

"Fair" of the small hole state refers to a state in which a slightly larger hole opens in the non-oriented film but the inner water vapor is stably discharged to the outside of the packaging bag.

"Bad" of the small hole state refers to a state in which the non-oriented film is stretched by the internal pressure of the bag more than expected and the bag ruptures. In this case, the "time until the small hole opened" of Table 5 refers to time until the bag ruptures.

What is claimed is:

1. A packaging material for a packaging bag or a lid of a packaging container, the packaging material being formed of a composite film obtained by bonding a first film formed of a resin film having a stretch ratio and a second film having a stretch ratio lower than the stretch ratio of the resin film forming the first film or formed of a non-oriented resin film, the first film having a region that is spaced apart from a part of the first film that is heat sealed when forming the packaging bag or container, and the packaging material having a function of opening a hole in a part of a film surface of the second film when a content of the packaging bag or container is heated by a microwave oven, the first film having a linear cut in a part of the region spaced apart from the part that is heat sealed when forming the packaging bag or container, the packaging material including:

a first strongly bonded section which has a predetermined length in a longitudinal direction of the cut and has a predetermined width in a direction perpendicular to the cut and in which the first film and the second film are firmly bonded to form the first strongly bonded section;

a first weakly bonded section and a second weakly bonded section which are provided on opposite sides of the first strongly bonded section, have a predetermined length larger than the length of the first strongly bonded section in the longitudinal direction of the cut, a predetermined width in a direction perpendicular to the cut, and in which the first film and the second film are weakly bonded, and the first strongly bonded section being provided with inhibiting means for inhibiting the second film located in the first strongly bonded section from being stretched until an inner side atmosphere of the composite film reaches a predetermined pressure due to heating by the microwave oven, wherein in the composite film, the first film and the second film are firmly bonded in an area around the first strongly bonded section, the first weakly bonded section and the second weakly bonded section.

2. The packaging material according to claim 1, wherein the cut has a continuous linear shape, a film piece is joined to the surface of the first film to bridge the first film on both sides of the cut of the first strongly bonded section, and the film piece forms the inhibiting means.

3. The packaging material according to claim 1, wherein the linear cut is not provided in the first strongly bonded section, and an uncut section not provided with the linear cut forms the inhibiting means.

4. The packaging material according to claim 1, wherein
a third weakly bonded section and a fourth weakly bonded section having a shape substantially the same as the shape of the first strongly bonded section are provided on opposite sides of the first strongly bonded section,
a second strongly bonded section and a third strongly bonded section having a shape substantially the same as the shape of the first strongly bonded section are further respectively provided on outer sides of the third weakly bonded section and the fourth weakly bonded section,
the cut has a continuous linear shape and is provided to pass through the first strongly bonded section, and
the second strongly bonded section, the third strongly bonded section, the third weakly bonded section, and the fourth weakly bonded section configure the inhibiting means.

5. The packaging material according to claim 3, wherein
a third weakly bonded section and a fourth weakly bonded section having a shape substantially the same as the shape of the first strongly bonded section are provided on opposite sides of the first strongly bonded section,
a second strongly bonded section and a third strongly bonded section having a shape substantially the same as the shape of the first strongly bonded section are further respectively provided on outer sides of the third weakly bonded section and the fourth weakly bonded section, and
the second strongly bonded section, the third strongly bonded section, the third weakly bonded section, and the fourth weakly bonded section configure the inhibiting means.

6. The packaging material according to claim 1, wherein at least one of the first film and the second film has an oxygen and/or water vapor barrier property.

7. A packaging bag,
comprising the packaging material according to claim 1.

8. A packaging container, wherein the packaging material according to claim 1 is used as a lid material.

9. A packaged body obtained by filling the packaging bag according to claim 7 with a content containing moisture or a content not containing moisture and moisture, and sealing the packaging bag.

10. A packaged body obtained by filling the packaging container according to claim 8 with a content containing moisture or a content not containing moisture and moisture, and sealing the packaging container.

* * * * *